US012626624B2

(12) United States Patent
Im et al.

(10) Patent No.: US 12,626,624 B2
(45) Date of Patent: May 12, 2026

(54) INSPECTING APPARATUS AND INSPECTING METHOD FOR DISPLAY DEVICE

(71) Applicant: Samsung Display Co., LTD., Yongin-si (KR)

(72) Inventors: Yongchae Im, Yongin-si (KR); Joon-Geol Kim, Yongin-si (KR); Heeyeon Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 253 days.

(21) Appl. No.: 18/389,390

(22) Filed: Nov. 14, 2023

(65) Prior Publication Data

US 2024/0274047 A1 Aug. 15, 2024

(30) Foreign Application Priority Data

Feb. 14, 2023 (KR) ......................... 10-2023-0019603

(51) Int. Cl.
  *G09G 3/00* (2006.01)
  *G01N 21/88* (2006.01)

(52) U.S. Cl.
  CPC ......... *G09G 3/006* (2013.01); *G01N 21/8851* (2013.01); *G01N 2021/8887* (2013.01)

(58) Field of Classification Search
  CPC .............. G09G 3/006; G01N 21/8851; G01N 2021/8887; G01N 2021/8427; G01N 21/8422; G01N 21/95; G01N 2201/1047; H10K 71/70; H01L 21/67242
  See application file for complete search history.

(56) References Cited

U.S. PATENT DOCUMENTS

| | | | | |
|---|---|---|---|---|
| 2012/0046884 A1* | 2/2012 | Oka | .................... | G01N 21/9501 |
| | | | | 702/40 |
| 2014/0043603 A1* | 2/2014 | Yanaka | .............. | G01N 21/9506 |
| | | | | 356/237.5 |
| 2019/0272630 A1* | 9/2019 | Inazumi | ................ | G06T 7/0008 |

FOREIGN PATENT DOCUMENTS

| | | | | | |
|---|---|---|---|---|---|
| CN | 106525877 | A | * 3/2017 | ............. | G01N 21/95 |
| CN | 110643441 | A | * 1/2020 | ................ | F26B 3/04 |
| CN | 112945977 | A | * 6/2021 | ............. | G01N 21/01 |
| JP | 2011257259 | A | 12/2011 | | |
| KR | 1020020023604 | A | 3/2003 | | |
| KR | 1020090060430 | A | 6/2009 | | |
| KR | 101256424 | B1 | 4/2013 | | |
| KR | 101757709 | B1 | 7/2017 | | |
| KR | 1020130003398 | A | 11/2017 | | |
| KR | 101898843 | B1 | 9/2018 | | |

OTHER PUBLICATIONS

English translation of CN-112945977-A (Year: 2021).*
English translation of CN-106525877-A (Year: 2017).*
English translation of CN-110643441-A (Year: 2020).*

* cited by examiner

*Primary Examiner* — Huy Q Phan
*Assistant Examiner* — Haidong Zhang
(74) *Attorney, Agent, or Firm* — CANTOR COLBURN LLP

(57) ABSTRACT

An inspecting apparatus for a display device including: a loader part into which the display device is inputted, a wet air forming part that generates moisture particle on a surface of the display device, an inspection part that inspects the surface of the display device, and an unloader part that emits the display device to an outside.

18 Claims, 7 Drawing Sheets

100

RV
42 41 22
30 43 DD 50
RL2 21
10

RL1

RL:RL1,RL2
40:41,42,43
20:21,22

DR2
DR3 DR1

RL:RL1,RL2
40:41,42,43
20:21,22

INSPECTING APPARATUS AND INSPECTING METHOD FOR DISPLAY DEVICE

This application claims priority to Korean Patent Application No. 10-2023-0019603, filed on Feb. 14, 2023, and all the benefits accruing therefrom under 35 U.S.C. § 119, the content of which in its entirety is herein incorporated by reference.

BACKGROUND

1. Field

Embodiments relate to an inspection apparatus and an inspection method for a display device.

2. Description of the Related Art

A display device displays an image for providing visual information to a user. Among display devices, an organic light-emitting diode display is attracting attention. An anti-fingerprint coating layer may be attached to a surface of the display device.

An inspecting apparatus may be used to remove defective products in a production process, an assembly process, or the like of the display device. The inspecting apparatus may check a shape of an inspection body by receiving light reflected from the inspection body. In addition, the inspecting apparatus may check whether the anti-fingerprint coating layer is well attached to the surface of the display device using the inspecting apparatus.

SUMMARY

Embodiments provide an inspecting apparatus for a display device with improved quality.

Embodiments provide an inspecting method for the display device.

An inspecting apparatus for a display device in an embodiment includes a loader part into which the display device is inputted, a wet air forming part that generates moisture particle on a surface of the display device, an inspection part that inspects the surface of the display device, and an unloader part that emits the display device to an outside.

In an embodiment, the inspection part may include a first imaging unit that inspects a front surface of the display device and a second imaging unit that inspects a side surface of the display device.

In an embodiment, the inspection part may further include a third imaging unit that inspects the side surface of the display device.

In an embodiment, each of the second imaging unit and the third imaging unit may be rotatable in a first direction as an axis.

In an embodiment, each of the second imaging unit and the third imaging unit may be movable in a second direction crossing the first direction.

In an embodiment, the wet air forming part may include a first manifold defining a plurality of holes in the surface and a second manifold disposed inside the first manifold and that generates and discharges relatively high humidity air.

In an embodiment, the inspecting apparatus may further include a first heater part disposed inside the second manifold and heating the second manifold and a second heater part disposed inside the second manifold and heating a slit attached to the second manifold.

In an embodiment, the second manifold may receive distilled water through a tube penetrating one hole of the plurality of holes.

In an embodiment, the inspecting apparatus may further include a moving part that moves the display device from the loader part to the unloader part in a first direction.

In an embodiment, wherein through the moving part, the display device may move from the loader part to the unloader part on a same plane.

In an embodiment, the wet air forming part and the inspection part may be adjacent to each other.

In an embodiment, the inspecting apparatus may further include a removing part that removes the moisture particle generated on the surface of the display device.

In an embodiment, the removing part may include an air blow.

An inspecting method for a display device in an embodiment includes inputting the display device into a loader part, moving the display device along a first direction, providing relatively high humidity air to a surface of the display device, and inspecting the display device.

In an embodiment, the providing the relatively high humidity air to the surface of the display device may include heating water and producing steam, mixing dry air with the steam and producing the relatively high humidity air, and providing the relatively high humidity air to the surface of the display device.

In an embodiment, the water may be distilled water.

In an embodiment, the inspecting the display device may include inspecting a front surface of the display device through a first imaging unit and inspecting a side surface of the display device through a second imaging unit and a third imaging unit.

In an embodiment, the inspecting the display device may further include measuring a contact angle between moisture particle generated on the surface of the display device and the surface of the display device.

In an embodiment, each of the second imaging unit and the third imaging unit may be rotatable in the first direction as an axis.

In an embodiment, each of the second imaging unit and the third imaging unit may be movable in a second direction crossing the first direction.

An inspecting apparatus for a display device in an embodiment includes a loader part into which a display device is inputted, a wet air forming part that generates moisture particle on a surface of the display device, an inspection part that inspects the surface of the display device, and an unloader part that emits the display device to outside.

Fine moisture particle may be generated on a surface of the display device through the wet air forming part. Accordingly, it is possible to prevent stain from occurring on the surface of the display device. That is, stain that may occur when relatively large moisture particle is generated on the surface of the display device may not occur.

In addition, both front surface and side surface of the display device may be inspected through a plurality of imaging units.

In addition, the display device may move on a same plane during an inspection process. Accordingly, time desired for inspection of the display device may be reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
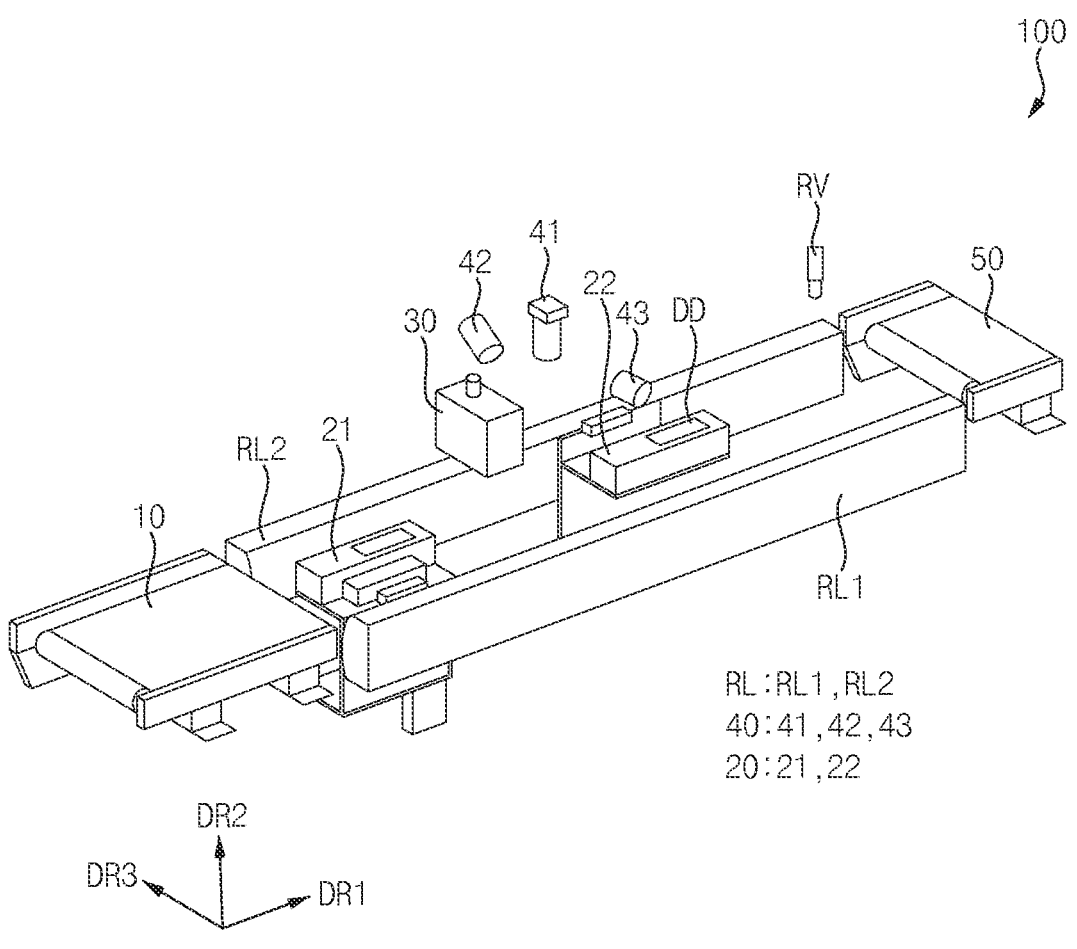
FIG. 1 is a schematic perspective view illustrating an embodiment of an inspecting apparatus of a display device.

Hereinafter, display devices in embodiments will be described in more detail with reference to the accompanying drawings. The same reference numerals are used for the same components in the drawings, and redundant descriptions of the same components will be omitted.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within +30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
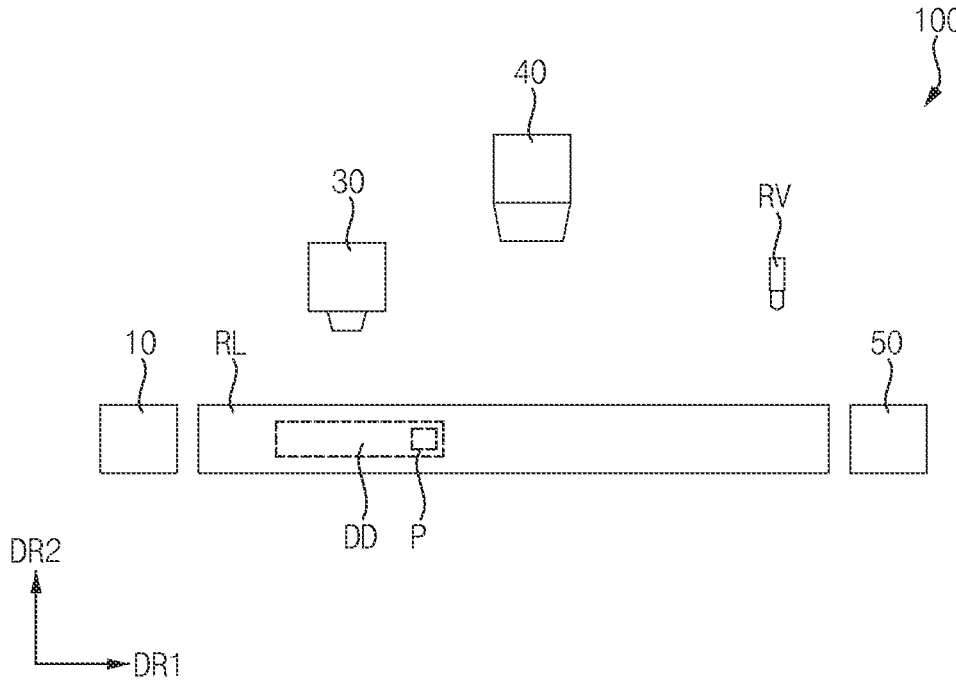
FIG. 2 is a schematic front view illustrating the inspecting apparatus of FIG. 1.

FIG. 1 is a schematic perspective view illustrating an embodiment of an inspecting apparatus of a display device. FIG. 2 is a schematic front view illustrating the inspecting apparatus of FIG. 1.

Referring to FIGS. 1 and 2, an inspecting apparatus 100 of a display device in an embodiment may include a loader part 10, a moving part 20, a rail RL, a wet air forming part 30, an inspection part 40, a removing part RV, and an unloader part 50.

The inspecting apparatus 100 of the display device in an embodiment may detect a defective display device DD by acquiring images of second and third dimensions of the display device DD. In an embodiment, through the images, it may be checked whether an anti-fingerprint coating layer is well attached to a surface of the display device DD, for example.

A first direction DR1 and a second direction DR2 crossing the first direction DR1 may be defined. In addition, a third direction DR3 perpendicular to a plane defined by the first direction DR1 and the second direction DR2 may be defined.

The display device DD may be disposed on the loader part 10. In an embodiment, a stage may be disposed in the loader part 10, for example. The display device DD may be disposed on the stage. The stage may include a plane defined by the first direction DR1 and the third direction DR3.

In an embodiment, the moving part 20 may include a first moving part 21 and a second moving part 22. In addition, the rail RL may include a first rail RL1 and a second rail RL2. However, this disclosure is not limited thereto, and in another embodiment, the moving part 20 may include one moving part. In addition, the rail RL may include one rail. In another embodiment, the moving part 20 may include three or more moving parts. In addition, the rail RL may include three or more rails.

Hereinafter, for convenience of description, an embodiment in which the moving part 20 includes the first moving part 21 and the second moving part 22 and the rail RL includes the first rail RL1 and the second rail RL2 will be mainly described.

Each of the first rail RL1 and the second rail RL2 may extend in the first direction DR1. That is, the first rail RL1 and the second rail RL2 may be parallel to each other. In addition, the second rail RL2 may be spaced apart from the first rail RL1 in the third direction DR3.

The display device DD may be disposed on the first moving part 21 and the second moving part 22. That is, the display device DD may be moved from the loader part 10 to the first moving part 21 and the second moving part 22. The first moving part 21 may move in the first direction DR1 along the first rail RL1. In addition, the second moving part 22 may move in the first direction DR1 along the second rail RL2.

The display device DD may move from the loader part 10 to the unloader part 50 through the moving part 20. In an embodiment, the display device DD may move on a same plane from the loader part 10 to the unloader part 50 through the moving part 20. That is, the display device DD may move in a plan view defined by the first direction DR1 and the third direction DR3.

For inspecting the display device DD using the inspecting apparatus of the display device according to a comparative example, the display device DD may move in the second direction DR2. That is, the display device DD may rise (that is, the second direction DR2) and fall (that is, a direction opposite to the second direction DR2). This may be because a wet air forming part and an inspection part of an inspecting apparatus of the display device according to a comparative example may not be adjacent to each other.

In contrast, in an embodiment of the inspecting apparatus 100 of the display device, the display device DD may move on the same plane from the loader part 10 to the unloader part 50. Therefore, from beginning of inspecting the display device DD to end of inspecting the display device DD, the display device DD may move along the first direction DR1 without rising and falling. Accordingly, time desired for inspection of the display device DD may be reduced.

The wet air forming part 30 may be spaced apart from the rail RL in the second direction DR2. The wet air forming part 30 may generate moisture particle on a surface of the display device DD.

The inspection part 40 may include a first imaging unit 41, a second imaging unit 42, and a third imaging unit 43. The inspection part 40 may emit light to the display device DD and the moisture particle. In addition, the inspection part 40 may obtain image data of the display device DD and the moisture particle using light reflected by the display device DD and the moisture particle.

In an embodiment, the inspection part 40 may be adjacent to the wet air forming part 30. Specifically, the inspection part 40 may be adjacent to the wet air forming part 30 in the first direction DR1. Accordingly, the inspection part 40 may inspect the display device DD and the moisture particle without changing shape or size of the moisture particle generated on the surface of the display device DD.

After the inspection process of the display device DD is completed, moisture particle generated on the surface of the display device DD may be removed. The moisture particle may be removed through natural vaporization. In an embodiment, the inspecting apparatus 100 of the display device may further include the removing part RV. The removing part RV may remove the moisture particle that have not been removed by natural vaporization. In an embodiment, the removing part RV may include an air blow.

When the first moving part 21 and/or the second moving part 22 are disposed adjacent to the unloader part 50, the display device DD placed on the first moving part 21 and/or the second moving part 22 may be moved to the unloader part 50. The display device DD may be released to outside of the inspecting apparatus 100 of the display device through the unloader part 50.

The display device DD may include a plurality of display parts P. Each of the plurality of display parts P may emit light. In addition, an anti-fingerprint coating layer may be attached to a surface of the display device DD. In an embodiment, the anti-fingerprint coating layer may include a fluorine-containing compound, for example.

Figure 3:
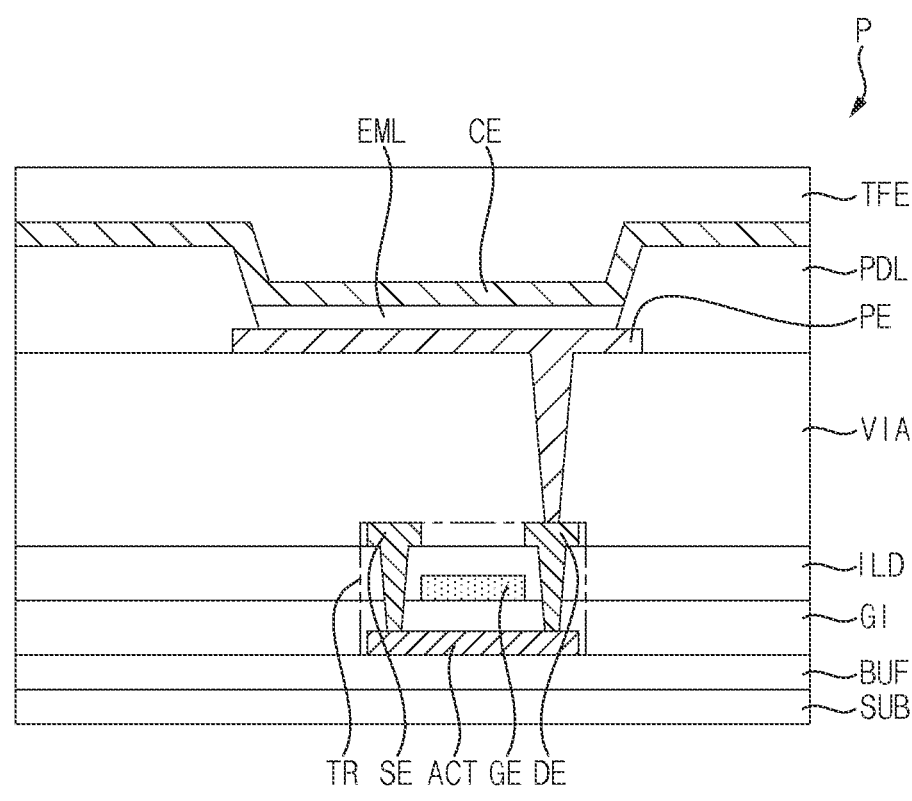
FIG. 3 is a schematic cross-sectional view illustrating a display part of a display device to be inspected by the inspecting apparatus of FIG. 2.
Figure 3:

FIG. 3 is a schematic cross-sectional view illustrating a display part of a display device to be inspected by the inspecting apparatus of FIG. 2.

The display part P may include a substrate SUB, a buffer layer BUF, a gate insulating layer GI, an inter-insulating layer ILD, a via-insulating layer VIA, an active layer ACT, a source electrode SE, a gate electrode GE, a drain electrode DE, a pixel electrode PE, a pixel defining layer PDL, a light-emitting layer EML, a common electrode CE, and an encapsulating layer TFE.

The transistor TR may include the active layer ACT, the source electrode SE, the gate electrode GE, and the drain electrode DE.

A substrate SUB may include a transparent material or an opaque material. The substrate SUB may include or consist of a transparent resin substrate. Example of the transparent resin substrate may include a polyimide substrate. In this case, the polyimide substrate may include a first organic layer, a first barrier layer, a second organic layer, or the like.

In an alternative embodiment, the substrate SUB may include a quartz substrate, a synthetic quartz substrate, a calcium fluoride substrate, a fluorine-doped quartz substrate, a sodalime substrate, a non-alkali glass substrate, or the like. These materials may be used alone or in any combinations with each other.

A buffer layer BUF may be disposed on the substrate SUB. The buffer layer BUF may prevent metal atoms or impurities from diffusing from the substrate SUB to the transistor TR. In addition, the buffer layer BUF may improve the flatness of a surface of the substrate SUB when the surface of the substrate SUB is not uniform.

In an embodiment, the buffer layer BUF may include an inorganic material such as silicon oxide, silicon nitride, silicon oxynitride, or the like, for example. These materials may be used alone or in any combinations with each other.

An active layer ACT may be disposed on the buffer layer BUF. The active layer ACT may include a metal oxide semiconductor, an inorganic semiconductor (e.g., amorphous silicon, polysilicon), an organic semiconductor, or the like. These materials may be used alone or in any combinations with each other. The active layer ACT may include a source area, a drain area, and a channel area disposed between the source area and the drain area.

The metal oxide semiconductor may include a binary compound ("$AB_x$"), a ternary compound ("$AB_xC_y$"), a tetragonal compound ("$AB_xC_yD_z$"), or the like including indium ("In"), zinc ("Zn"), gallium ("Ga"), tin ("Sn"), titanium ("Ti"), aluminum ("Al"), hafnium ("Hf"), zirconium ("Zr"), magnesium ("Mg"), or the like.

In an embodiment, the metal oxide semiconductor may include zinc oxide ("$ZnO_x$"), gallium oxide ("$GaO_x$"), tin oxide ("$SnO_x$"), indium oxide ("$InO_x$"), indium gallium oxide ("IGO"), indium zinc oxide ("IZO"), indium tin oxide ("ITO"), indium zinc tin oxide ("IZTO"), and indium gallium zinc oxide ("IGZO"), for example. These materials may be used alone or in any combinations with each other.

A gate insulating layer GI may be disposed on the buffer layer BUF. The gate insulating layer GI may sufficiently cover the active layer ACT, and may have a substantially flat upper surface without generating a step around the active layer ACT. In an alternative embodiment, the gate insulating layer GI may cover the active layer ACT and may be disposed along a profile of the active layer ACT.

In an embodiment, the gate insulating layer GI may include inorganic materials such as silicon oxide ("SiO$_x$"), silicon nitride ("SiN$_x$"), silicon carbide ("SiC$_x$"), silicon oxynitride ("SiO$_x$N$_y$"), silicon oxycarbide ("SiO$_x$C$_y$"), or the like, for example. These materials may be used alone or in any combinations with each other.

A gate electrode GE may be disposed on the gate insulating layer GI. The gate electrode GE may overlap the channel area of the active layer ACT.

The gate electrode GE may include a metal, an alloy metal nitride, a conductive metal oxide, a transparent conductive material, or the like. In embodiments, the metal may include silver ("Ag"), molybdenum ("Mo"), aluminum ("Al"), tungsten ("W"), copper ("Cu"), nickel ("Ni"), chromium ("Cr"), titanium ("Ti"), tantalum ("Ta"), platinum ("Pt"), scandium ("Sc"), or the like. In embodiments, the conductive metal oxide may include Indium tin oxide, indium zinc oxide, or the like. In addition, embodiments of the metal nitride may include aluminum nitride ("AlN$_x$"), tungsten nitride ("WN$_x$"), chromium nitride ("CrN$_x$"), or the like. Each of these materials may be used alone or in any combinations with each other.

An inter-insulating layer ILD may be disposed on the gate insulating layer GI. The inter-insulating layer ILD may sufficiently cover the gate electrode GE, and may have a substantially flat upper surface without generating a step around the gate electrode GE. In an alternative embodiment, the inter-insulating layer ILD may cover the gate electrode GE, and may be disposed along a profile of the gate electrode GE.

In an embodiment, the inter-insulating layer ILD may include inorganic materials such as silicon oxide, silicon nitride, silicon carbide, silicon oxynitride, silicon oxycarbide, or the like, for example. These materials may be used alone or in any combinations with each other.

A source electrode SE may be disposed on the inter-insulating layer ILD. The source electrode SE may be connected to the source area of the active layer ACT through a contact hole penetrating the gate insulating layer GI and the inter-insulating layer ILD.

A drain electrode DE may be disposed on the inter-insulating layer ILD. The drain electrode DE may be connected to the drain area of the active layer ACT through a contact hole penetrating the gate insulating layer GI and the inter-insulating layer ILD.

In an embodiment, the source electrode SE may include a metal, an alloy, a metal nitride, a conductive metal oxide, a transparent conductive material, or the like, for example. These materials may be used alone or in any combinations with each other. The drain electrode DE may be formed through the same process as the source electrode SE and may include the same material as that of the source electrode SE.

A via-insulating layer VIA may be disposed on the inter-insulating layer ILD. The via-insulating layer VIA may sufficiently cover the source electrode SE and the drain electrode DE. The via-insulating layer VIA may include an organic material. In an embodiment, the via-insulating layer VIA may include organic materials such as phenolic resin, acrylic resin, polyimide resin, polyamide resin, siloxane resin, epoxy resin, or the like, for example. These materials may be used alone or in any combinations with each other.

A pixel electrode PE may be disposed on the via-insulating layer VIA. The pixel electrode PE may be connected to the drain electrode DE through a contact hole penetrating the via-insulating layer VIA.

The pixel electrode PE may include a metal, an alloy, a metal nitride, a conductive metal oxide, a transparent conductive material, or the like. These materials be used alone or in any combinations with each other. In an embodiment, the pixel electrode PE may have a stacked structure including ITO/Ag/ITO. In an embodiment, the pixel electrode PE may operate as an anode, for example.

A pixel defining layer PDL may be disposed on the via-insulating layer VIA. The pixel defining layer PDL may cover both side portions of the pixel electrode PE. In addition, an opening exposing a portion of the upper surface of the pixel electrode PE may be defined in the pixel defining layer PDL.

In an embodiment, the pixel defining layer PDL may include an inorganic material or an organic material. In an embodiment, the pixel defining layer PDL may include an organic material such as an epoxy resin, a siloxane resin, or the like, for example. These materials may be used alone or in any combinations with each other. In another embodiment, the pixel defining layer PDL may further include a light-blocking material including or consisting of a black pigment, a black dye, or the like.

A light-emitting layer EML may be disposed on the pixel electrode PE. The light-emitting layer EML may include an organic material that emits light of a predetermined color. In an embodiment, the light-emitting layer EML may include an organic material that emits red light, for example. However, the disclosure is not limited thereto, and the light-emitting layer EML may emit light of a different color from red light.

A common electrode CE may be disposed on the light-emitting layer EML and the pixel defining layer PDL. The common electrode CE may include a metal, an alloy, a metal nitride, a conductive metal oxide, a transparent conductive material, or the like. These materials may be used alone or in any combinations with each other. The common electrode CE may operate as a cathode.

An encapsulating layer TFE may be disposed on the common electrode CE. The encapsulating layer TFE may prevent impurities and moisture from penetrating into the pixel electrode PE, the light-emitting layer EML, and the common electrode CE from the outside. The encapsulating layer TFE may include at least one inorganic layer and at least one organic layer.

In an embodiment, the inorganic layer may include silicon oxide, silicon nitride, silicon oxynitride, or the like, for example. These materials may be used alone or in any combinations with each other. The organic layer may include a polymer cured product such as polyacrylate.

Although an embodiment of the display part P has been described with reference to FIG. 3, the display part P is not limited to the structure shown in FIG. 3. That is, the display part P may include all structures that receive an electrical signal and emit light having a luminance corresponding to the intensity of the electrical signal.

Figure 4:
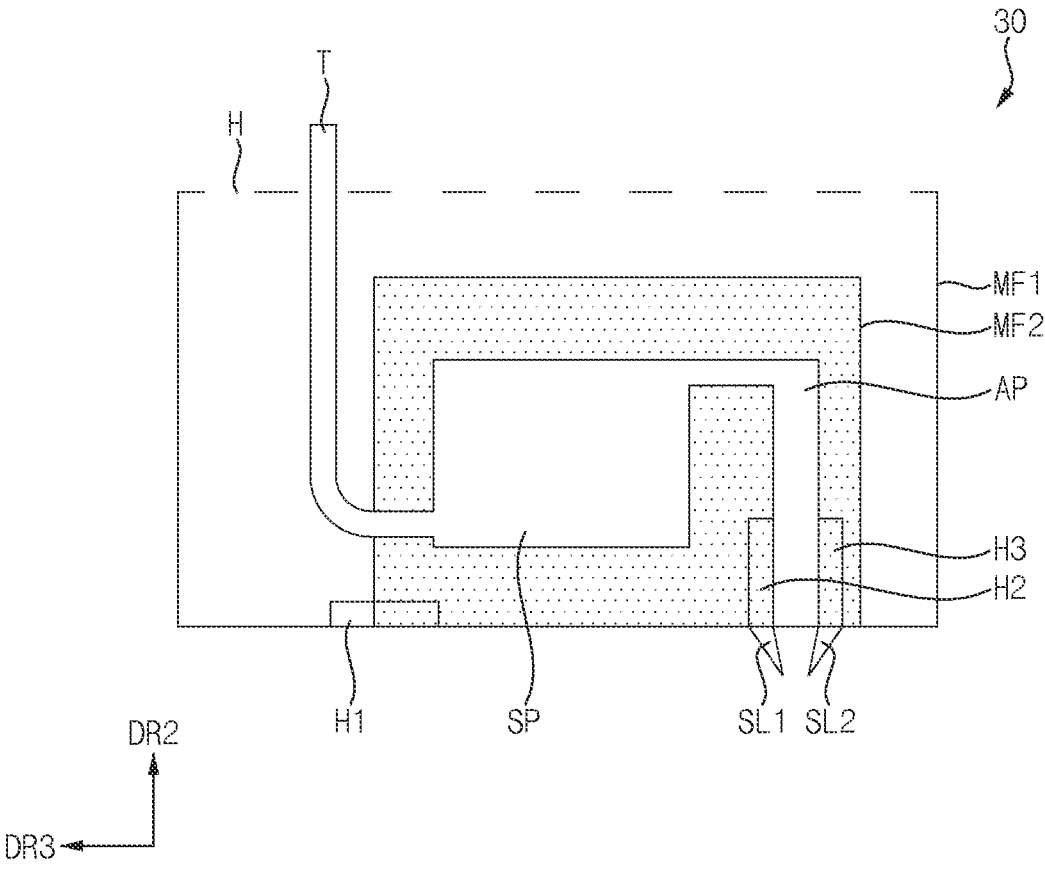
FIG. 4 is a schematic cross-sectional view illustrating a wet air forming part included in the inspecting apparatus of FIG. 1.

FIG. 4 is a schematic cross-sectional view illustrating a wet air forming part included in the inspecting apparatus of FIG. 1.

Referring to FIGS. 1 and 4, the wet air forming part 30 may include a first manifold MF1, a second manifold MF2, a tube T, a first heater part H1, a second heater part H2, a third heater part H3. A first unit slit SL1 and a second unit slit SL2 may be defined in the wet air forming part 30.

The first manifold MF1 may define a plurality of holes H in an upper surface of the first manifold MF1. Heat generated from the second manifold MF2 may be released through a plurality of holes H.

The second manifold MF2 may be disposed inside the first manifold MF1. The second manifold MF2 may receive dry air. Specifically, the dry air may be supplied to an inner space SP of the second manifold MF2. In addition, the second manifold MF2 may receive water through a tube T (or a pipe) penetrating one hole of the plurality of holes H. Specifically, the water may be supplied to the inner space SP of the second manifold MF2.

In an embodiment, the water may be distilled water. This may be because when impurities or the like are included in the water, moisture particle may be improperly formed on the surface of the display device DD.

The first heater part H1 may be disposed inside the second manifold MF2. The first heater part H1 may heat the second manifold MF2. Accordingly, the water supplied to the inner space SP may be heated. When the water reaches a predetermined temperature, steam may be generated. The dry air supplied to the inner space SP and the steam may be mixed. Accordingly, relatively high humidity air may be formed.

The second heater part H2 and the third heater part H3 may be disposed inside the second manifold MF2. The second heater part H2 may be attached to the first unit slit SL1. In addition, the third heater part H3 may be attached to the second unit slit SL2. Accordingly, the second heater part H2 and the third heater part H3 may heat the first unit slit SL1 and the second unit slit SL2, respectively. That is, the second heater part H2 may maintain temperature of the first unit slit SL1 equal to or similar to temperature of the second manifold MF2. In addition, the third heater part H3 may maintain temperature of the second unit slit SL2 equal to or similar to the temperature of the second manifold MF2.

When the temperature of each of the first unit slit SL1 and the second unit slit SL2 is lower than the temperature of the second manifold MF2, moisture particle may be condensed in the first unit slit SL1 and the second unit slit SL2 as the relatively high humidity air passes through the first unit slit SL1 and the second unit slit SL2. The second heater part H2 and the third heater part H3 may prevent the moisture particle from being condensed on the first unit slit SL1 and the second unit slit SL2.

In an embodiment, each of the first heater part H1, the second heater part H2, and the third heater part H3 may include a heating coil, for example. However, this disclosure is not limited thereto, and each of the first heater part H1, the second heater part H2, and the third heater part H3 may include different types of heating devices.

The relatively high humidity air may be released to outside through an air passage AP. Specifically, the relatively high humidity air may be released to outside of the first manifold MF1 and the second manifold MF2 through the air passage AP. The relatively high humidity air may be uniformly released to the outside through the first unit slit SL1 and the second unit slit SL2.

The relatively high humidity air may reach the surface of the display device DD. Accordingly, fine moisture particle may be formed on the surface of the display device DD. Accordingly, it is possible to prevent stains from occurring on the surface of the display device DD. That is, stains that may occur when relatively large moisture particle is generated on the surface of the display device DD may not occur.

In addition, a cooling part for condensing the moisture particle on the surface of the display device DD may not be desired. When the cooling part is used, damage or the like may occur on the surface of the display device DD. In an embodiment of this disclosure, the inspecting apparatus 100 of the display device may condense the moisture particle on the surface of the display device DD through only the wet air forming part 30 rather than the cooling part. Accordingly, damage to the surface of the display device DD may be prevented.

In addition, through the inspection part 40, after the inspection process of the display device DD is completed, the fine moisture particle may be removed by natural vaporization. Accordingly, preferably, the removing part RV may not be desired.

Figure 5:
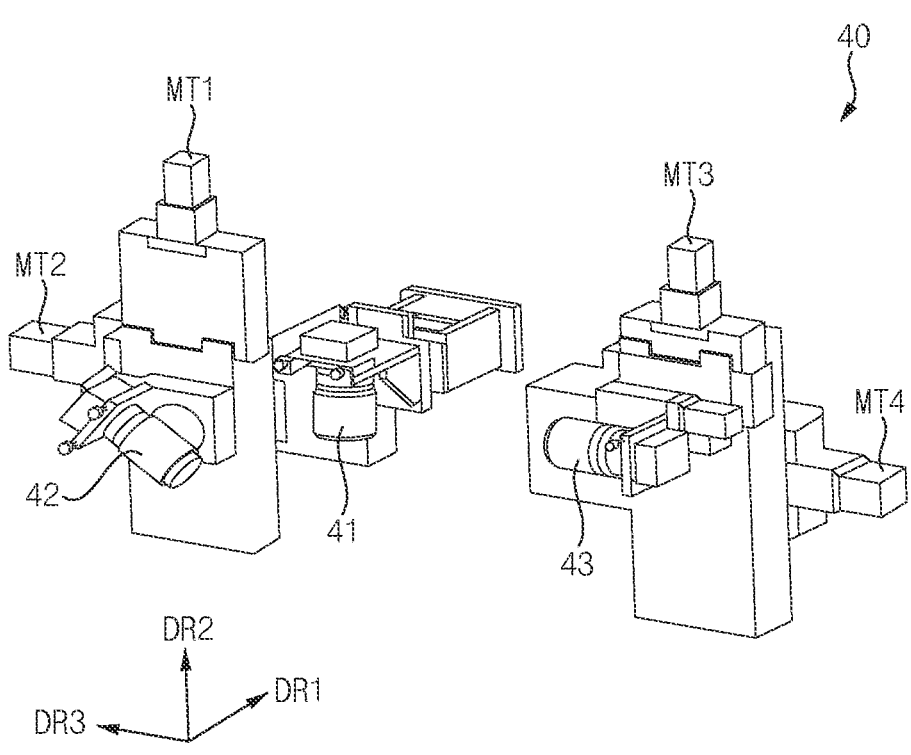
FIG. 5 is a schematic perspective view illustrating an inspection part included in the inspecting apparatus of FIG. 1.

FIG. 5 is a schematic perspective view illustrating an inspection part included in the inspecting apparatus of FIG. 1.

Referring to FIGS. 1 and 5, the inspection part 40 may include a first imaging unit 41, a second imaging unit 42, a third imaging unit 43, a first motor MT1, a second motor MT2, a third motor MT3, and a fourth motor MT4.

The first imaging unit 41 may inspect a front surface of the display device DD. In an embodiment, the first imaging unit 41 may inspect whether the anti-fingerprint coating layer is well attached to the front surface of the display device DD, for example. However, purpose of disclosure is not limited thereto, and the first imaging unit 41 may inspect whether there is another type of defect in the front surface of the display device DD. In an embodiment, the first imaging unit 41 may inspect whether the anti-static coating layer is well attached to the front of the display device DD, for example.

The second imaging unit 42 may inspect a side surface of the display device DD. Specifically, the second imaging unit 42 may inspect the side surface adjacent to the front surface of the display device DD of in the third direction DR3. In an embodiment, the second imaging unit 42 may inspect whether the anti-fingerprint coating layer is well attached to the side surface of the display device DD, for example.

In an embodiment, the second imaging unit 42 may move in a direction opposite to the second direction DR2 and the second direction DR2 through the first motor MT1. In addition, the second imaging unit 42 may rotate in the first direction DR1 as an axis through the second motor MT2.

The side surface of the display device DD may include a curved surface. Each of a plurality of display devices DD may have curved surfaces having different shapes. In an embodiment, each of the plurality of display devices DD may have curved surfaces having different curvatures, for example. The second imaging unit 42 may move in a direction opposite to the second direction DR2 and the second direction DR2. In addition, the second imaging unit 42 may rotate in the first direction DR1 as an axis. Accordingly, the second imaging unit 42 may acquire an image of the side surface regardless of the shape of the side surface of each of the plurality of display devices DD.

The third imaging unit 43 may inspect a side surface of the display device DD. Specifically, the third imaging unit 43 may inspect the side surface adjacent to the front surface of the display device DD in the third direction DR3. In an embodiment, the third imaging unit 43 may inspect whether the anti-fingerprint coating layer is well attached to the side surface of the display device DD, for example.

In an embodiment, the third imaging unit 43 may move in a direction opposite to the second direction DR2 and the second direction DR2 through the third motor MT3. In addition, the third imaging unit 43 may rotate in the first direction DR1 as an axis through the fourth motor MT4. Accordingly, the third imaging unit 43 may acquire an image of the side surface regardless of the shape of the side surface of each of the plurality of display devices DD.

Figure 6:
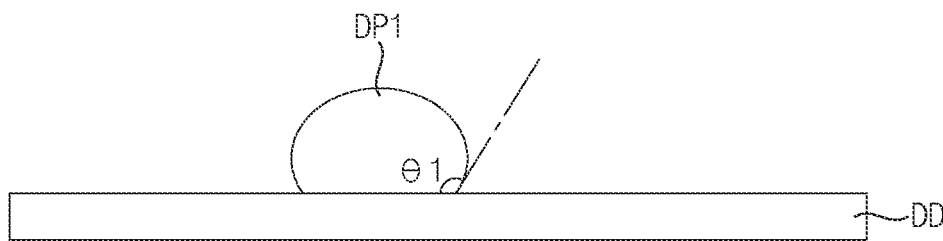
FIGS. 6 and 7 are schematic cross-sectional views illustrating generation of moisture particle on a surface of a display device.
Figure 7:
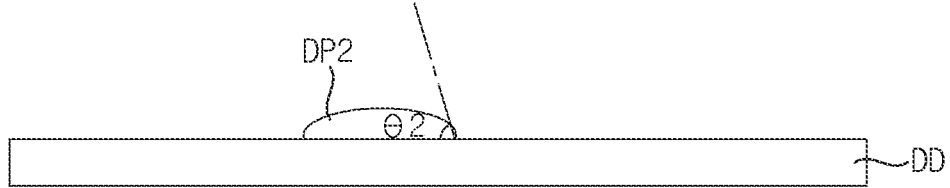

FIGS. 6 and 7 are schematic cross-sectional views illustrating generation of moisture particle on a surface of a display device. Specifically, FIG. 6 is a schematic cross-sectional view illustrating that the anti-fingerprint coating layer is well attached to the surface of the display device. In addition, FIG. 7 is a schematic cross-sectional view illustrating that the anti-fingerprint coating layer is not attached to the surface of the display device.

Referring to FIGS. 1 and 6, the anti-fingerprint coating layer may be well attached to the surface of the display device DD. Moisture particle may be formed on the surface of the display device DD through the wet air forming part 30. In an embodiment, the first moisture particle DP1 may be formed on the surface of the display device DD, for example.

When the anti-fingerprint coating layer is well attached to the surface of the display device DD, image of the first moisture particle DP1 obtained through the inspection part 40 may be brighter than a second moisture particle (e.g., a second moisture particle DP2 of FIG. 7).

In addition, a first contact angle $\theta1$ of the first moisture particle DP1 may be about 110 degrees or more and about 130 degrees or less. Preferably, the first contact angle $\theta1$ of the first moisture particle DP1 may be about 121 degrees. The first contact angle $\theta1$ may be an angle defined by the first moisture particle DP1 and the surface of the display device DD.

Referring to FIGS. 1 and 7, the anti-fingerprint coating layer may not be well attached to the surface of the display device DD. Moisture particle may be formed on the surface of the display device DD through the wet air forming part 30. In an embodiment, the second moisture particle DP2 may be formed on the surface of the display device DD, for example.

When the anti-fingerprint coating layer is not well attached to the surface of the display device DD, image of the second moisture particle DP2 obtained through the inspection part 40 may be darker than the first moisture particle (e.g., the first moisture particles DP1 of FIG. 6).

In addition, a second contact angle $\theta2$ of the second moisture particle DP2 may be about 60 degrees or more and about 70 degrees or less. Preferably, the second contact angle $\theta2$ of the second moisture particle DP2 may be about 65 degrees. The second contact angle $\theta2$ may be an angle defined by the second moisture particle DP2 and the surface of the display device DD.

That is, through brightness and contact angle of the moisture particle formed on the surface of the display device DD, it may be confirmed whether the anti-fingerprint coating layer is well attached to the surface of the display device DD. However, use of this disclosure is not limited thereto, and it may be confirmed whether other types of coating layers are well attached to the surface of the display device DD. Using the inspecting apparatus 100 of the display device in an embodiment, it may be confirmed whether the anti-static coating layer is well attached to the surface of the display device DD, for example.

Figure 8:
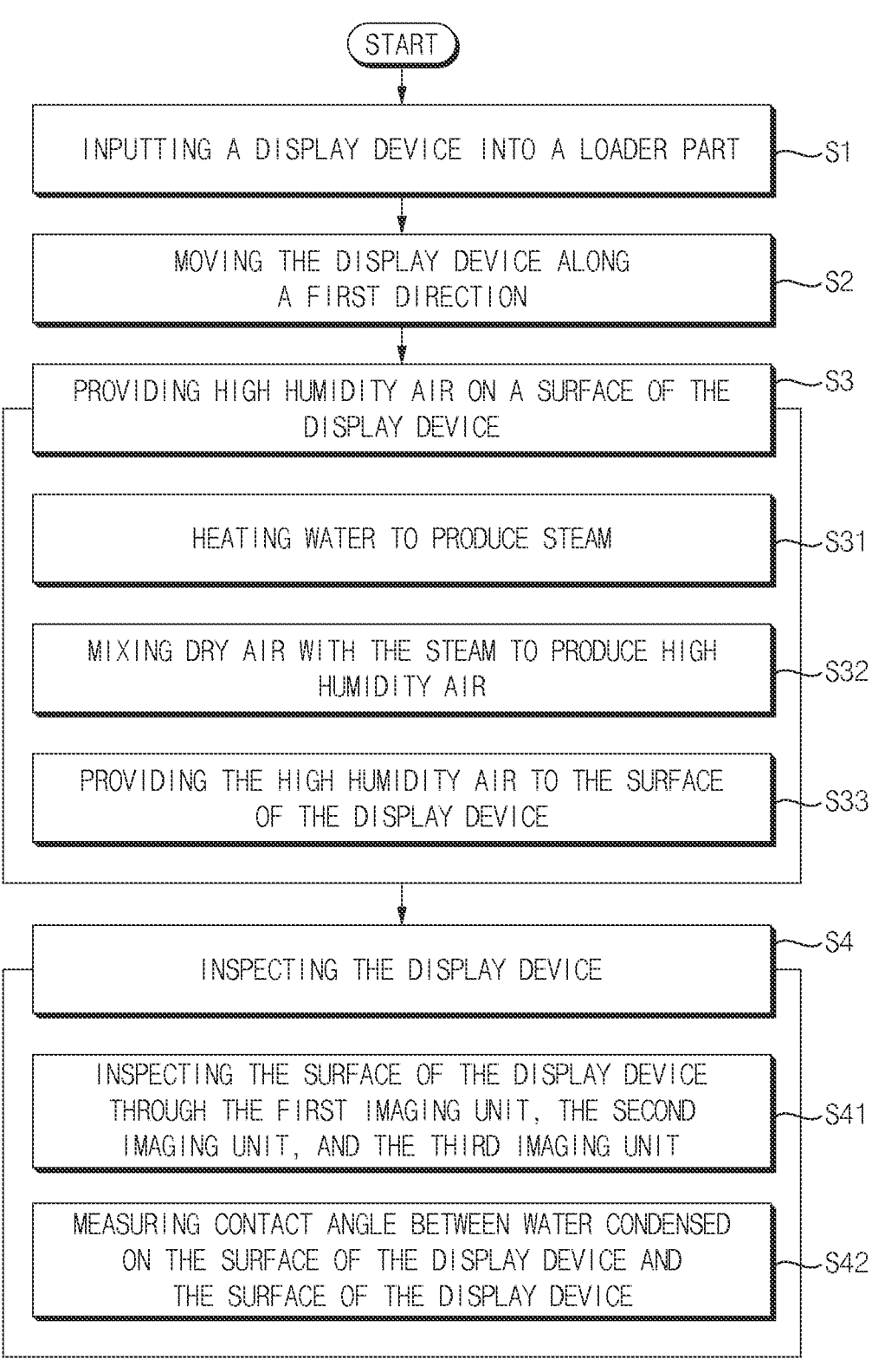
FIG. 8 is a flowchart illustrating an inspecting method of a display device.

FIG. 8 is a flowchart illustrating an embodiment of an inspecting method of a display device.

Referring to FIGS. 1 and 8, an inspecting method for a display device in an embodiment may include inputting a display device DD into a loader part 10 (operation S1), moving the display device DD along a first direction DR1 (operation S2), providing relatively high humidity air on a surface of the display device DD (operation S3), and inspecting the display device DD (operation S4).

After inputting the display device DD into the loader part 10 (operation S1), the display device DD may be moved along the first direction DR1 (operation S2). That is, the display device DD may be moved from the loader part 10 to the moving part 20. Thereafter, the display device DD and the moving part 20 may move along the first direction DR1.

The display device DD and the moving part 20 may be disposed below the wet air forming part 30. The wet air forming part 30 may provide relatively high humidity air to the surface of the display device DD (operation S3).

Providing relatively high humidity air to the surface of the display device DD by the wet air forming part 30 (operation S3) may include heating water to produce steam S31, mixing dry air with the steam to produce relatively high humidity air (operation S32), and providing the relatively high humidity air to the surface of the display device DD (operation S33). In an embodiment, the water may be distilled water.

Inspecting the display device DD (operation S4) may include inspecting the surface of the display device DD through the first imaging unit 41, the second imaging unit 42, and the third imaging unit 43 (operation S41). Specifically, inspecting the display device DD S4 may include inspecting the front surface of the display device DD through the first imaging unit 41 and inspecting the side surface of the display device DD through the second imaging unit 42 and the third imaging unit 43 (operation S41).

As described with reference to FIGS. 6 and 7, it may be confirmed whether the anti-fingerprint coating layer is well attached to the surface of the display device DD through the brightness of the moisture particle.

In an embodiment, inspecting the display device DD (operation S4) may further include measuring the contact angle (e.g., the first contact angle $\theta1$ of FIG. 6) between the water condensed on the surface of the display device DD and the surface of the display device DD (operation S42) As described with reference to FIGS. 6 and 7, it may be confirmed whether the anti-fingerprint coating layer is well attached to the surface of the display device DD through the contact angle of the moisture particle.

In another embodiment, measuring the contact angle between the water condensed on the surface of the display device DD and the surface of the display device DD (operation S42) may be omitted. That is, by confirming only the brightness of the moisture particle, it may be confirmed whether the anti-fingerprint coating layer is well attached to the surface of the display device DD.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims. Therefore, it is to be understood that the foregoing is illustrative of various embodiments and is not to be construed as limited to the illustrative embodiments disclosed, and that modifications to the disclosed embodiments, as well as other embodiments, are intended to be included within the scope of the appended claims.

What is claimed is:

1. An inspecting apparatus for a display device comprising:

a loader part into which the display device is inputted;

a humidity air forming part which generates moisture particle on a surface of the display device, the humidity air forming part comprising:

a first manifold defining a plurality of holes in an upper surface; and a second manifold disposed inside the first manifold and which generates and discharges humidity air;

an inspection part which inspects the surface of the display device; and an unloader part which emits the display device to an outside.

2. The inspecting apparatus of claim 1, wherein the inspection part includes:

a first imaging unit which inspects a front surface of the display device; and a second imaging unit which inspects a side surface of the display device.

3. The inspecting apparatus of claim 2, wherein the inspection part further includes:

a third imaging unit which inspects the side surface of the display device.

4. The inspecting apparatus of claim 3, wherein each of the second imaging unit and the third imaging unit is rotatable in a first direction as an axis.

5. The inspecting apparatus of claim 4, wherein each of the second imaging unit and the third imaging unit is movable in a second direction crossing the first direction.

6. The inspecting apparatus of claim 1, further comprising:

a first heater part disposed inside the second manifold and heating the second manifold; and a second heater part disposed inside the second manifold and heating a slit attached to the second manifold.

7. The inspecting apparatus of claim 1, wherein the second manifold receives distilled water through a tube penetrating one hole of the plurality of holes.

8. The inspecting apparatus of claim 1, further comprising:

a moving part which moves the display device from the loader part to the unloader part in a first direction.

9. The inspecting apparatus of claim 8, wherein through the moving part, the display device moves from the loader part to the unloader part on a same plane.

10. The inspecting apparatus of claim 1, wherein the humidity air forming part and the inspection part are adjacent to each other.

11. The inspecting apparatus of claim 1, further comprising:

a removing part which removes the moisture particle generated on the surface of the display device.

12. The inspecting apparatus of claim 11, wherein the removing part includes an air blow.

13. An inspecting method for a display device, the method comprising:

inputting the display device into a loader part;

moving the display device along a first direction;

providing humidity air to a surface of the display device; and inspecting the display device, wherein the inspecting the display device further includes:

measuring a contact angle between moisture particle generated on the surface of the display device and the surface of the display device.

14. The method of claim 13, wherein the providing the humidity air to the surface of the display device includes:

heating water and producing steam;

mixing air drier than the humidity air with the steam and producing the humidity air; and providing the humidity air to the surface of the display device.

15. The method of claim 14, wherein the water is distilled water.

16. The method of claim 13, wherein the inspecting the display device includes:

inspecting a front surface of the display device through a first imaging unit; and inspecting a side surface of the display device through a second imaging unit and a third imaging unit.

17. The method of claim 16, wherein each of the second imaging unit and the third imaging unit is rotatable in the first direction as an axis.

18. The method of claim 17, wherein each of the second imaging unit and the third imaging unit is movable in a second direction crossing the first direction.

\* \* \* \* \*